United States Patent [19]

Byerley et al.

[11] 3,962,767

[45] June 15, 1976

[54] METHOD FOR REPAIRING A HEAT EXCHANGER TUBE

[75] Inventors: Wilbur M. Byerley, Riverview; Raymond H. Glatthorn, St. Petersburg, both of Fla.; Emil P. Lock, Monroeville, Pa.

[73] Assignee: Westinghouse Electric Corporation, Pittsburgh, Pa.

[22] Filed: Aug. 13, 1974

[21] Appl. No.: 497,180

[52] U.S. Cl. .............................. 29/157.3 R; 29/402; 29/157.3 C; 29/401 E; 228/154; 228/119; 29/157.4; 138/97; 138/98; 138/142; 165/76; 285/397; 285/370; 285/286; 285/15
[51] Int. Cl.² ...................................... B23P 15/26
[58] Field of Search ...................... 138/97, 98, 142; 285/397, 370, 286, 213, 15; 165/76; 29/157.4, 401, 470.5, 475, 402, 157.3 R, 157.3 C; 219/137; 228/3, 154

[56] References Cited
UNITED STATES PATENTS

| | | | |
|---|---|---|---|
| 507,974 | 10/1893 | Crosby | 228/154 |
| 1,499,581 | 7/1924 | Kibele | 285/397 X |
| 1,990,077 | 2/1935 | Kershaw | 29/423 |
| 2,337,584 | 12/1943 | Baker | 29/157.3 R |
| 2,478,684 | 8/1949 | Brooks | 138/97 |
| 2,850,798 | 9/1958 | Bowman et al. | 228/154 |
| 2,962,306 | 11/1960 | Hawthorne | 219/137 R X |
| 3,427,707 | 2/1969 | Nowosadko | 228/154 |
| 3,562,887 | 2/1971 | Schroeder et al. | 29/157.4 |
| 3,638,684 | 2/1972 | Pavilon | 29/401 X |
| 3,645,435 | 2/1972 | Doherty et al. | 228/3 |
| 3,670,140 | 6/1972 | Roberts | 29/157.4 X |
| 3,691,614 | 9/1972 | Bernard et al. | 29/470.5 |
| 3,768,841 | 10/1973 | Byrne et al. | 285/370 X |
| 3,781,966 | 1/1974 | Lieberman | 29/401 |
| 3,791,026 | 2/1974 | Dufrene et al. | 228/154 |
| 3,807,024 | 4/1974 | Harvey et al. | 29/401 |
| 3,895,432 | 7/1975 | Diepers et al. | 29/599 |

FOREIGN PATENTS OR APPLICATIONS

| | | | |
|---|---|---|---|
| 507,084 | 11/1951 | Belgium | 228/154 |
| 873,691 | 6/1971 | Canada | 29/401 |
| 858,908 | 1/1961 | United Kingdom | 29/157.3 C |
| 667,143 | 2/1952 | United Kingdom | 228/154 |
| 743,526 | 1/1956 | United Kingdom | 228/154 |

*Primary Examiner*—C. W. Lanham
*Assistant Examiner*—V. K. Rising
*Attorney, Agent, or Firm*—F. J. Baehr, Jr.

[57] ABSTRACT

A method of repairing a tube in a heat exchanger by severing the tube and welding a sleeve inside the tube.

7 Claims, 4 Drawing Figures

METHOD FOR REPAIRING A HEAT EXCHANGER TUBE

BACKGROUND OF THE INVENTION

1. Field of the Invention

This invention relates to heat exchangers, and more particularly, to a method of repairing a tube in a heat exchanger.

2. Description of the Prior Art

Heat exchangers formed from a plurality of tubes have traditionally been susceptible to developing leaks in one or more tubes, and since the processes in which heat exchangers are utilized generally require separation of the primary and secondary fluids, leaky tubes are normally removed from service by inserting a tapered plug and driving it into the end of a tube with a hammer or, more recently, by utilizing welding, including explosive welding, to weld a plug in a tube.

When leaks occur in straight tube heat exchangers, the tubes can often be replaced; however, when the heat exchanger is formed from a plurality of U-shaped tubes, replacing a single tube becomes more of a problem, and in some cases, impossible without removing several tubes.

Tube failures often occur in or near the tube sheet; therefore, to learn the nature of the defect causing the failure, it is desirable to remove the tube or at least a portion of the tube so that it may be inspected and tested in order to learn as much as possible about the cause of the failure.

SUMMARY OF THE INVENTION

Among the several objects of this invention is the provision of a method by which a portion of the tube can be replaced with tubing having the same or different metallurgical properties without appreciably altering the method so that rapid and reliable repair and replacement can be made. Such a method for repairing a tube disposed in a tube sheet of a heat exchanger, when performed in accordance with the method described in this invention, comprises the steps of removing scale and oxidation products from the inner surface of the tube, severing the tube, inserting a sleeve into the tube so that the leading edge of the sleeve is disposed beyond the area where the tube was severed, expanding at least a portion of the sleeve into engagement with the tube, flooding at least a portion of the tube with a gas suitable for providing a shield for welding the sleeve to the tube and welding the leading edge of the sleeve to the tube.

DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
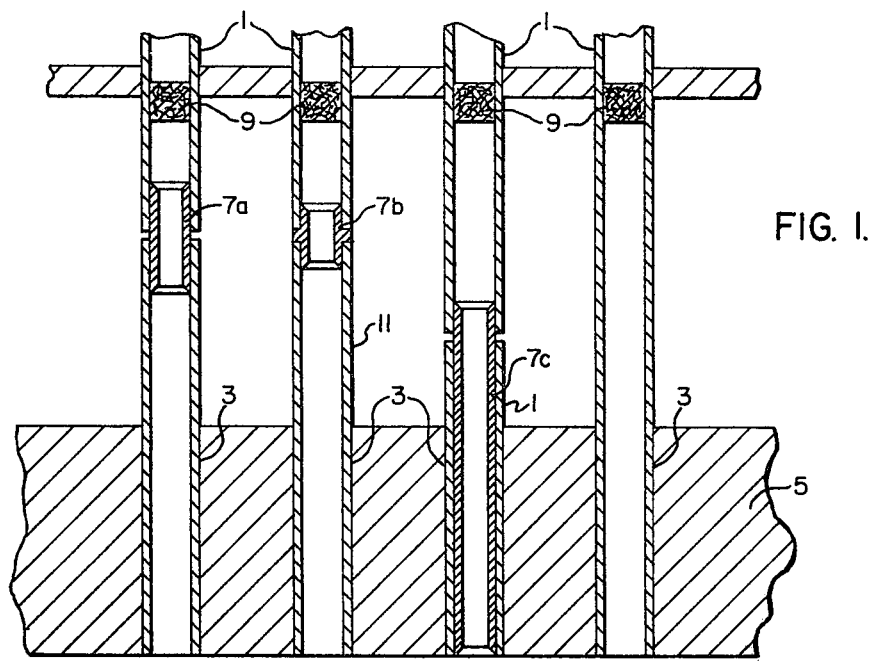
FIG. 1 is a partial sectional view of a plurality of tubes disposed in a tube sheet, all but one of the tubes being repaired by a method described in this invention.
Figure 2:
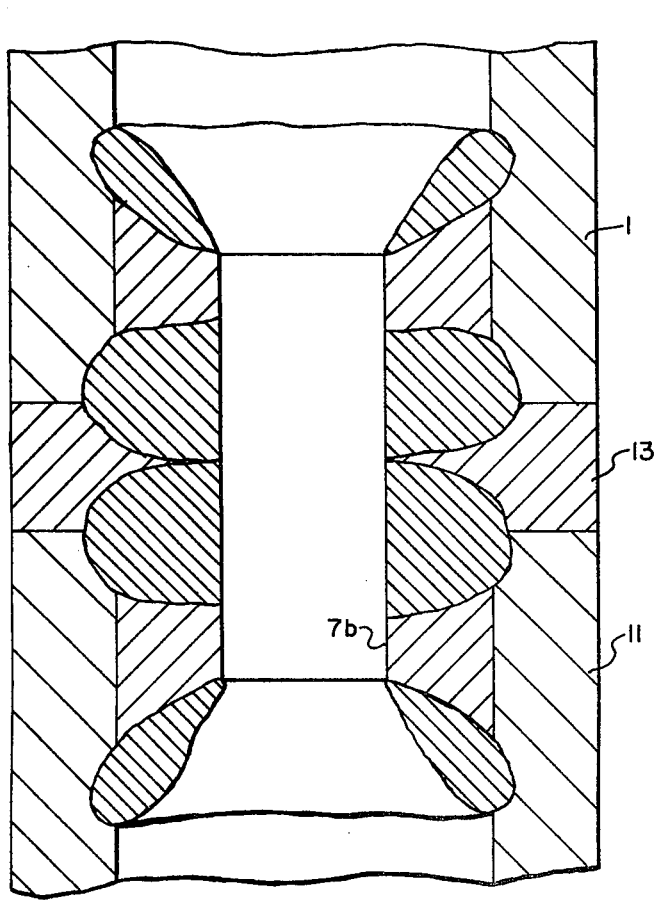
FIG. 2 is an enlarged partial sectional view showing the details of the welding of a sleeve to the tube.

Referring now to the drawings in detail, and FIG. 1 in particular, there is shown a portion of a heat exchanger in which a plurality of tubes 1 are disposed in holes 3 of a tube sheet 5.

The first three tubes, beginning on the left in the drawings, are repaired utilizing a sleeve 7a, 7b or 7c which is welded to the tube 1 by a fully automatic, remotely controlled, gas tungsten arc welding torch or other means.

The method by which the tubes 1 are repaired comprises the following steps:

removing scale, oxidation products and other foreign material from at least a portion of the inner surface of the tube 1 by honing, sanding or other means in order to prepare the inner surface of the tube for welding;

severing the tube 1 generally above the defect or ruptured area, if the severed portion is to be removed; however, if the severed portion is not to be removed, the tube 1 may be severed anywhere between the proposed welds. Severing the tube 1 advantageously produces a small gap that prevents undue stresses, which result from differential expansion of the tube 1 and the sleeve 7, from developing adjacent the welds, when the sleeve is disposed over a defective or ruptured area in the tube 1 and welded thereto;

inserting a sleeve 7a, b or c formed from a suitable filler metal into the tube 1 so that the leading edge of the sleeve 7a, b or c, which is defined as the edge first entering the tube, is disposed beyond the area where the tube 1 was severed and beyond the defect or rupture;

expanding at least a portion of the sleeve 7a, b or c into engagement with the tube 1 by rolling or other means to locate the sleeve 7a, b or c and then expanding the entire sleeve 7a, b or c into engagement with the tube 1;

plugging a portion of the tube 1 with a felt or other type of temporary plug 9 adjacent the sleeve 7a, b or c;

flooding at least the plugged portion of the tube 1 with inert or other gas suitable for welding the sleeve 7a, b or c to the tube 1;

welding the leading edge of the sleeve 7a, b or c to the tube 1 the welds being made inside the tube;

removing the plug 9 from the tube 1.

Alternately, the method may comprise the step of:

welding the trailing edge of the sleeve 7a to the wall of the tube 1 or the sleeve 7c to the end of the tube 1 as shown in FIG. 1.

Figure 3:
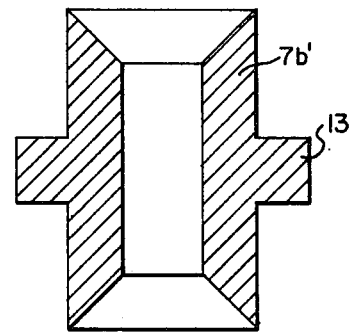
FIGS. 3 and 4 show alternate sleeve details.
Figure 4:
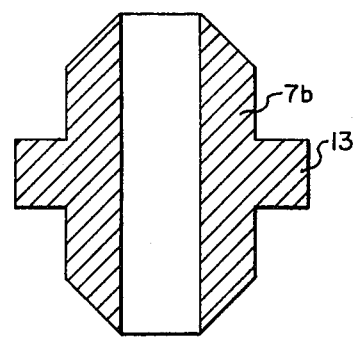

Another modification of this method comprises the steps of:

removing the severed portion of the tube 1 from the tube sheet 5;

inserting the sleeve 7b in one end of a piece of tubing 11 which has the same dimensions as the tube 1, the sleeve 7b being so disposed that approximately one half of the sleeve 7b extends from the tubing 11, whereby the sleeve 7b has an outer diameter which fits snugly into the severed tube 1;

welding the edge of the sleeve 7b to the tubing;

inserting the tubing 11 through the hole 3 in the tube sheet 5 from which the severed portion of the tube 1 was removed so that the leading edge of the tubing 11 containing the sleeve 7b can enter the tube 1;

locating the leading edge of the sleeve 7b in the severed tube 1;

expanding the sleeve 7b into engagement with the severed tube 1 by rolling or other means;

welding the sleeve 7b to the severed tube 1;

expanding the tubing 11 into engagement with the tube sheet 5 by rolling or other means;

welding the tubing 11 to the tube sheet 5;

forming the tubing 11 from a material other than that utilized to form the tubes 1 so that other tube materials can be installed in a heat exchanger economically to provide field test data;

forming the sleeve 7b so that the outer diameter is slightly smaller than the inner diameter of the tube 1;

forming the sleeve 7b so that it has a raised ring or girth band 13 generally the same outer diameter as the tube 1 in order to increase the section modulus to the central portion of the sleeve 7b to resist bending moments and to provide sufficient metal for welding the sleeve 7b to the end of the severed tube 1 and to the end of the tubing 11;

forming the sleeve 7b' or 7b, respectively, so that the ends thereof are beveled inwardly toward the ends as shown in FIG. 4 or outwardly toward the ends, as shown in FIG. 3, the former being preferred;

forming the sleeve 7b of a metal composition utilized as filler metal for welding tubes 1 or tubes 1 and tubing 11, whereby the sleeve 7 can be easily welded to the tube 1 and tubing 11 and the tube 1 and tubing 11 can be different metal compositions;

welding the sleeve 7b to the tube 1 at the ends of the sleeve 7b and adjacent the edges of the raised girth band 13, the sleeve 7b supplying the filler metal for welding and being automatically welded to the tube by a fully automatic, remotely controlled, gas tungsten arc welding torch or other welding means.

The method herebefore described advantageously allows for economical repair of tubes, economical and reliable removal of a portion of a tube and the installation of a section of tubing 11 of the same or different metallurgical properties from the tubes 1 forming the heat exchanger.

What is claimed is:

1. A method for repairing a defective portion of a tube disposed in a tube sheet in a heat exchanger, said method comprising the steps of:
    removing scale and oxidation products from the inner surface of at least a portion of said tube,
    severing said tube so as to form a gap therein,
    with the tube sheet as a reference point inserting a sleeve into said tube so that the leading edge of said sleeve is disposed beyond the area where said tube was severed and beyond the defective portion,
    expanding at least a portion of said sleeve into engagement with said tube,
    flooding at least the portion of said tube containing said sleeve with a gas suitable for welding said sleeve to said tube,
    welding the leading edge of said sleeve to said tube and,
    forming the sleeve from material suitable as a filler metal when welding two tubes together
    forming the sleeve so as to be sufficiently long and locating the sleeve so that it covers the defective portion of the tube and the gap, and
    welding the trailing end of the sleeve to the tube.

2. The method set forth in claim 1, wherein the step of forming the sleeve includes forming the sleeve so that the ends thereof are beveled so as to slope inwardly toward the ends.

3. A method for repairing a defective portion of a tube disposed in a tube sheet in a heat exchanger, said method comprising the steps of:
    removing scale and oxidation products from the inner surface of at least a portion of said tube,
    severing said tube so as to form a gap therein,
    with the tube sheet as a reference inserting a sleeve into said tube so that the leading edge of said sleeve is disposed beyond the area where said tube was severed and beyond the defective portion,
    expanding at least a portion of said sleeve into engagement with said tube,
    flooding at least the portion of said tube containing said sleeve with a gas suitable for welding said sleeve to said tube,
    welding the leading edge of said sleeve to said tube,
    removing the severed portion which contains the defective portion of said tube from said heat exchanger,
    replacing the removed portion of said tube with tubing,
    welding said sleeve to said tubing, and
    expanding said tubing into engagement with said tube sheet to form a seal therebetween.

4. The method set forth in claim 3 and further comprising the step of forming the sleeve so that it has a raised girth band generally the same outer diameter as the tube.

5. The method as set forth in claim 4 and further comprising the step of welding the tubing to the tube sheet.

6. The method set forth in claim 4, wherein the step of forming the sleeve includes forming the sleeve so that the ends thereof are beveled so as to slope inwardly toward the ends.

7. The method as set forth in claim 4, wherein the step of forming the sleeve includes the step of forming the sleeve so that the ends thereof are beveled to slope outwardly toward the ends.

* * * * *